United States Patent [19]

Namiki et al.

[11] Patent Number: 5,130,961
[45] Date of Patent: Jul. 14, 1992

[54] DUAL SOURCE AUDIO APPARATUS WITH PHOTOSENSOR FOR DETECTING A RECORDING MEDIUM BEING INSERTED

[75] Inventors: Akio Namiki; Teruo Takahashi, both of Saitama, Japan

[73] Assignee: Pioneer Electronic Corporation, Tokyo, Japan

[21] Appl. No.: 607,426

[22] Filed: Oct. 31, 1990

[30] Foreign Application Priority Data

Mar. 30, 1990 [JP] Japan .................................... 2-81009

[51] Int. Cl.⁵ .............................................. H04B 1/20
[52] U.S. Cl. .............................................. 369/6; 369/10
[58] Field of Search .................. 369/2, 5, 6, 53, 54, 369/58, 233, 7, 9–12, 75.1, 75.2, 77.1, 77.2; 360/5, 6

[56] References Cited

U.S. PATENT DOCUMENTS

| | | | |
|---|---|---|---|
| 3,400,227 | 9/1968 | Lear et al. | 369/10 |
| 3,646,278 | 2/1972 | Panizzi | 369/2 |
| 3,821,489 | 6/1974 | Kocubej | 369/10 |
| 4,149,043 | 4/1979 | Itoh et al. | 369/10 |
| 4,389,716 | 6/1983 | Pearson | 369/6 |
| 4,627,044 | 12/1986 | Takahashi et al. | 369/53 |
| 4,995,027 | 2/1991 | Aoyagi et al. | 369/77.1 |

Primary Examiner—Roy N. Envall, Jr.
Assistant Examiner—Paul W. Huber
Attorney, Agent, or Firm—Sughrue, Mion, Zinn Macpeak & Seas

[57] ABSTRACT

An audio apparatus incorporating a CD player or a cassette tape deck and a radio receiver as integral audio components, includes a photosensor; a means for detecting an operating state of each audio source; and a drive mode switching means for automatically changing the photosensor to a continuous active mode or to an intermittent active mode according to a detection output of the source detecting means. When the CD or cassette tape is inserted, the active source is automatically switched to the corresponding CD player or cassette tape deck. Further, the photosensor is placed in the continuous active mode to eliminate noise generation when a source other than the CD or cassette tape is in operation. It is switched to the intermittent active mode to reduce power consumption when none of the sources is in operation.

2 Claims, 3 Drawing Sheets

DUAL SOURCE AUDIO APPARATUS WITH PHOTOSENSOR FOR DETECTING A RECORDING MEDIUM BEING INSERTED

BACKGROUND OF THE INVENTION

The present invention relates to an audio apparatus that incorporates a CD player or a cassette tape deck and a radio receiver as integral audio components.

PRIOR ART

A car-mounted audio apparatus, for example, has a CD player and a radio receiver built into a compact body frame. Such an apparatus with a plurality of built-in audio devices generally gives a particular level of priority of use to each device to improve the operability of the apparatus and ensure the safety of driving. For example, when a compact disc or CD is inserted into the CD player while the radio set is turned on, the active source is automatically switched from the radio to the CD player.

As a means for detecting the CD being inserted, a photosensor made up of a pair of light emitting and receiving elements, such as light emitting diode and phototransistor, is installed at an appropriate position in the CD insertion opening to detect when the CD being inserted blocks the detection light of the photosensor. Two methods have been available for driving the CD insertion detection photosensor—a so-called "continuous active mode" in which the light emitting element is energized at all times and an "intermittent active mode" in which the light emitting element is turned on and off at short intervals according to a specified duty ratio.

For audio apparatuses with built-in cassette tape deck and radio receiver, too, these methods are also used for detecting the insertion of the cassette tape.

With the continuous active mode, the photosensor is energized at all times, that is, current is always flowing through the photosensor, so that the power consumption is large. Especially in the car-mounted audio apparatuses that use a battery as a power source, the battery would be exhausted in the worst case. In the intermittent active mode, since the current flows at specified intervals in pulses, noise is easily generated giving rise to undesired effects on other sources such as radio.

SUMMARY OF THE INVENTION

The present invention has been accomplished with a view to overcoming the above drawbacks and its objective is to provide an audio apparatus which can eliminate adverse effects on other sources such as radio while at the same time minimizing the power consumption.

To achieve the above objective, an audio apparatus according to this invention, which incorporates a CD player or a cassette tape deck and a radio receiver as integral audio components, comprises: a photosensor for detecting a CD or cassette tape being inserted; a means for detecting the operating state of each audio source; and a drive mode switching means for automatically changing the drive mode of the photosensor to a continuous active mode or to an intermittent active mode according to a detection output of the source operating state detecting means; whereby when the CD or cassette tape is inserted, the active source is automatically switched to the corresponding CD player or cassette tape deck, and the photosensor is placed in the continuous active mode when a source other than the CD or cassette tape is in operation and in the intermittent active mode when none of the sources is in operation.

When an audio source other than CD or cassette tape is in operation, the photosensor is energized in the continuous active mode. Hence the drive current for the photosensor is not turned on or off, so that noise generation is prevented. When none of the sources is used, the photosensor is energized in the intermittent active mode. Since the drive current for the photosensor flows intermittently at intervals that correspond to a specified duty ratio, the power consumption becomes smaller to a degree corresponding to the duty ratio. As a result, sources other than CD and cassette tape are free from interference by noise and the power consumption of the audio apparatus as a whole is reduced.

PREFERRED EMBODIMENT OF THE INVENTION

One embodiment of this invention will be described by referring to the attached drawings.

Figure 1:
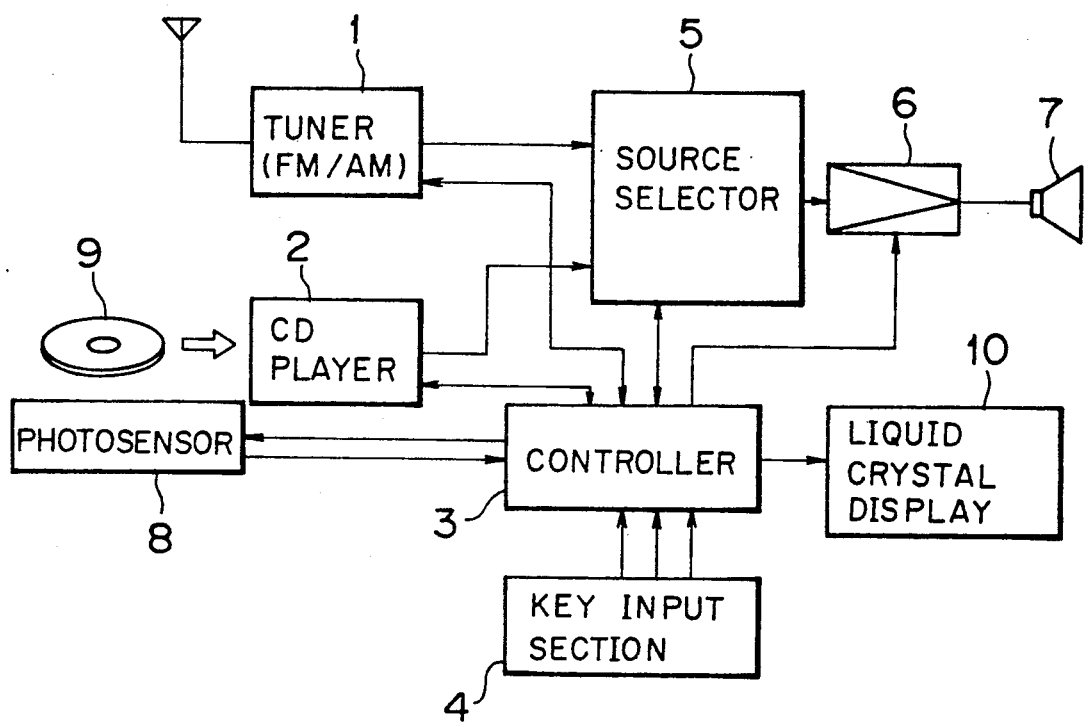
FIG. 1 is a block diagram of one embodiment of the invention.

FIG. 1 shows a block diagram of an audio apparatus as one embodiment of this invention that incorporates, as integral audio components, a CD player and a radio receiver in a single body. The outputs of a tuner 1 and a CD player 2 are selected by a source selector 5 under the control of a controller 3 according to the command entered from a key input section 4 and is then fed to an amplifier 6 to sound a speaker 7. A photosensor 8 is installed at an appropriate position in a CD insertion opening in the CD player 2 to detect a CD 9 being inserted. Reference numeral 10 represents a vidual display unit such as liquid crystal display that indicates the operating state of the apparatus in a predetermined form. Although the photosensor 8 is actually arranged inside the CD player 2, it is shown separately outside the CD player for the convenience of explanation.

Figure 2:
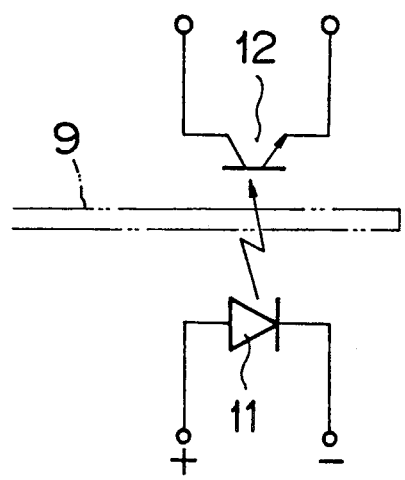
FIG. 2 is an example of configuration of a photosensor.

To explain it in more detail, the photosensor 8 is generally formed of a pair of light emitting and receiving elements such as light emitting diode 11 and phototransistor 12, as shown in FIG. 2. The light emitting diode 11 and phototransistor 12 are put in a proper location in the CD insertion path so that the CD insertion is detected when the detection light is interrupted by the CD 9. The photosensor 8, as detailed later, is operated in one of two drive modes—an intermittent active mode of FIG. 3 A and a continuous active mode of FIG. 3 B—under the control of the controller 3.

Figure 4:
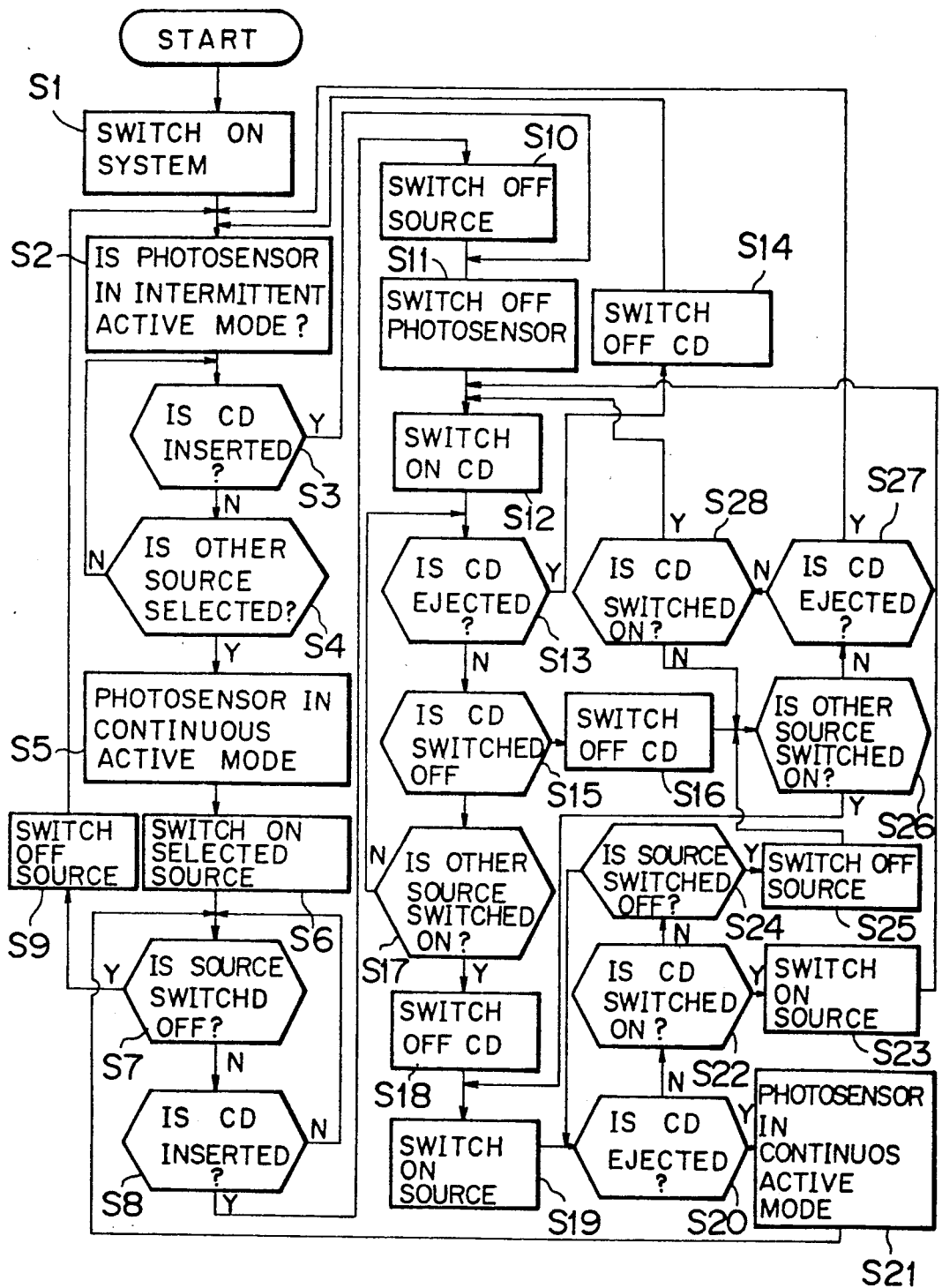
FIG. 4 is a flowchart showing the sequence of operations performed on the embodiment.

Now, referring to the flowchart of FIG. 4, we will explain about the operation of the embodiment.

Figure 3A:
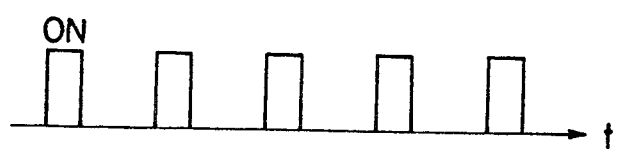
FIG. 3 is a timing diagram illustrating an intermittent active mode and a continuous active mode.
Figure 3B:
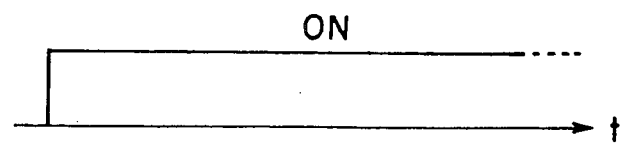

When a power of the audio apparatus is switched on (step S1), the photosensor 8 is applied a drive current representing the intermittent active mode of FIG. 3 A, which is fed from the controller 3, so that the light emitting diode 11 is illuminated intermittently (step S2). The phototransistor 12 begins the CD insertion detecting operation by sensing the intermittently radiated light (step S3).

When no CD 9 is found inserted, it is then checked whether other source than CD has been selected, that is, in this embodiment whether the tuner 1 has been selected (step S4). When the tuner 1 is found selected, the drive mode for the photosensor 8 is switched from the intermittent active mode to the continuous active mode of FIG. 3 B (step S5), followed by the power of the tuner 1 being turned on (step S6) to energize the radio under the control of the controller 3 according to the command from the key input section 4. Then monitoring is performed to see whether the tuner 1 is deselected (step S7) and whether the CD is inserted into the CD player 2 (step S8). When the tuner 1 is deselected, the power of the tuner 1 is turned off (step S9) and the program returns to step S2 where it switches the photosensor 8 to the intermittent active mode again.

As mentioned above, when neither of the tuner 1 and the CD player 2 is used, the photosensor 8 is operated in the intermittent active mode of FIG. 3 A, so that the power consumption is reduced to a degree corresponding to the duty ratio. When a source other than the CD, in this embodiment the tuner 1, is selected, the photosensor 8 automatically switches over to the continuous active mode of FIG. 3 B, in which the drive current for the photosensor 8 is not turned on and off but is supplied continuously to prevent a possible noise interference with the radio.

Further, when the CD 9 is inserted into the CD player 2, this embodiment has a configuration that turns off the drive power to the photosensor 8 while the CD is being inserted to permit further reduction in power consumption. This is because once the CD is inserted, there is no need to continue monitoring for CD insertion until it ejected.

To describe more concretely, when the CD 9 is inserted into the CD player 2 while the radio is on (step S8), the controller 3 turns off the power of the tuner 1 (step S10) and also the photosensor 8 (step S11), which was being operated in the continuous active mode. Then the controller 3 turns on the power of the CD player 2 (step S12) to start the playback of the CD under the control of the controller 3 according to the command from the key input section 4. When the CD 9 is inserted with no sources in operation (step S3), the controller 3 turns off the power of the photosensor 8 which was operating in the intermittent active mode (step S11), and then turns on the CD player 2 (step S12) to start the playback of the inserted CD.

When, after the CD playback is finished, the CD 9 is ejected from the CD player 2 (step S13), the program turns off the CD player 2 (step S14) and returns to step S2 where it switches the photosensor 8 back to the intermittent active mode. On the other hand, when the ejection of CD 9 is not detected at step S13, the controller 3 monitors at steps S15 to S28 for the operating states of the tuner 1 and CD player 2 and for the ejection of the CD 9. With the CD player 2 turned off and the tuner 1 on, when the CD 9 is ejected, the controller 3 at step S21 switches the photosensor 8, which was off, to the continuous active mode and returns to step S7. If, with both the tuner 1 and the CD player 2 out of operation, the CD 9 is ejected, the program goes through step S27 back to step S2 where it causes the photosensor 8, which was off, to switch into the intermittent active mode again.

In this way, the photosensor 8 can be controlled in an optimum operation mode.

While the above embodiment has been shown as an audio apparatus that incorporates a CD player and a radio receiver, the invention can also be applied to an audio apparatus that combines a radio set with a cassette tape deck. The latter audio apparatus can be obtained by replacing the CD player 2 of FIG. 1 with a cassette tape deck and the CD 9 with a cassette tape.

Furthermore, this invention is applicable to an audio apparatus equipped with both the CD player and the cassette tape deck. In that case, the aforementioned processing should be carried out for both the CD player and the cassette tape deck.

As can be seen from the foregoing, in this embodiment the photosensor is automatically switched into the continuous active mode when a source other than the CD or cassette tape is activated and into the intermittent active mode when none of the sources is in operation. This makes it possible to eliminate adverse effects on the other source of the noise that is caused by the on-off switching of the photosensor drive current, while at the same time reducing the power consumption of the apparatus. Particularly in the case of the car-mounted audio apparatus that uses as a power source a battery which has a limited capacity, the advantage of this invention is significant.

What is claimed is:

1. An audio apparatus incorporating a CD player or a cassette tape deck and a radio receiver as integral audio components, comprising:
   a photosensor for detecting a CD or cassette tape being inserted;
   a means for detecting the operating state of each audio source; and
   a drive mode switching means for automatically changing the drive mode of the photosensor to a continuous active mode or to an intermittent active mode according to a detection output of the source operating state detecting means;
   whereby when the CD or cassette tape is inserted, the active source is automatically switched to the corresponding CD player or cassette tape deck, and the photosensor is placed in the continuous active mode when a source other than the CD or cassette tape is in operation and in the intermittent active mode when none of the sources are in operation.

2. An audio apparatus as claimed in claim 1, wherein a power source of said photosensor is turned off while the CD or cassette tape is being inserted.

* * * * *